| United States Patent [19] | [11] Patent Number: 4,975,201 |
| Ma | [45] Date of Patent: Dec. 4, 1990 |

[54] CONDENSATE PURIFICATION PROCESS

[75] Inventor: King W. Ma, Tokyo, Japan

[73] Assignee: The Dow Chemical Company, Midland, Mich.

[21] Appl. No.: 422,879

[22] Filed: Oct. 17, 1989

[51] Int. Cl.$^5$ ................................................ C02F 1/42
[52] U.S. Cl. ..................................... 210/686; 210/688
[58] Field of Search ................................ 210/686, 688

[56]     References Cited
U.S. PATENT DOCUMENTS 4,313,832  2/1982  Shimizu et al. ...................... 210/663
4,564,644  1/1986  Harris .................................... 526/80

*Primary Examiner*—Ivars Cintins

[57]     ABSTRACT

A process for treatment of power plant condensate water particularly from a boiling water nuclear reactor, where the condensate contains colloidal material, especially oxidized iron from the steam and condensate handling system known as "crud". The colloidal iron level of the condensate is lowered by contacting the condensate water with a mixed bed ion exchange resin in which at least the cation exchange resin has a core/shell morphology which has been prepared by a polymerization of monomer within a multiplicity of free radical-containing matrices.

14 Claims, No Drawings

CONDENSATE PURIFICATION PROCESS

BACKGROUND OF THE INVENTION

The invention pertains to the purification of power plant condensate water. In nuclear power plants and in conventional fossil fuel plants, it is desired to maintain the level of dissolved and suspended species in the steam loop at a minimum to avoid corrosion. In a boiling water nuclear reactor (BWR), it is especially desirable to maintain the water in the steam loop as pure as possible because the impurities in that loop are subjected to irradiation when passing through the "hot" side of the loop. This causes such impurities in many cases to themselves become radioactive species, which must then be handled and ultimately disposed of in a safe manner when it is necessary to clean the steam loop. Furthermore, accumulation of suspended solids may cause pressure build up in the system, reducing flow rate and lessening the efficiency of the power plant operation. Consequently, the lower the level of impurities, especially suspended solids, that can be maintained in the steam loop the better.

Japanese Kokai publication 1-174998 (1989) proposes the removal of suspended impurities from the primary coolant of a boiling water nuclear power reactor by use of mixed bed ion exchange resins having low cross-linker (divinylbenzene) content of 3-7.5 percent. The publication theorizes that lower cross-linked resins have larger micropores and are relatively soft and more elastic than ion exchange resins having a higher level of cross-linkage and that these properties permit the lower cross-linked resins to more effectively remove the "crud" from condensate water.

In Japanese Kokai publication 63-59355 (1988) it is noted from an English abstract of same that a cation exchange resin was oxidized in a dilute sodium sulfate solution using platinum electrodes with a 2 ampere current for 3 to 4 hours. The oxidized resin is said to be useful for removal of fine, amorphous particles in condensate water, which particles are produced from corrosion of the piping and other materials of construction in thermal or nuclear power plants.

In U.S. Pat. No. 4,564,644 are described shell/core morphology ion exchange resins. They are of the same structure as those utilized in the present process. They are said at column 13, lines 3-12, to be useful under harsher conditions than prior gel-type resins and in particular for condensate polishing and in mining operations. However, their special ability to remove colloidal iron to a previously unattainable degree is not suggested nor is any special utility for BWR condensate crud removal mentioned.

SUMMARY OF THE INVENTION

The invention is a process for the reduction of colloidal iron in power plant condensate water. More particularly, it is a process for treatment of BWR condensate water to reduce the colloidal iron to levels which, over an extended time, are significantly lower than obtained when using conventional gel-type ion exchange resins in the same process.

With the invention process, sustained removal of about 95 percent of colloidal iron is attained, compared to sustained removal of only about 75-80 percent in processes utilizing conventional ion exchange resins in mixed beds.

The invention process comprises contacting BWR condensate water which contains colloidal iron with a mixed bed ion exchanger and thereafter decontacting the water, now having a reduced colloidal iron content, from the ion exchanger, wherein the mixed bed ion exchanger comprises:

Component (1)—a particulate cation exchange resin, at least a portion of which is in the acid form, and Component (2)—a particulate anion exchange resin, wherein at least the Component (1) resin, and preferably also the Component (2) resin, prior to functionalization as hereinafter defined, primarily comprises gel-type copolymer beads having core and shell structure, which beads have been produced in stages by first forming in a continuous phase a multiplicity of polymermatrices which contain free radicals, then imbibing in said matrices a monomer feed comprising at least one monomer but no free radical initiator and subjecting the imbibed monomer feed to conditions such that the free radicals in the matrices catalyze polymerization of the monomer feed within the matrices.

Preferably, the copolymer beads employed in Component (1) or (2), and more preferably both, comprise beads of copolymers prepared at least partially from a monovinylidene aromatic monomer and a divinylidene aromatic monomer. Especially preferred are copolymer beads comprised of copolymers prepared at least partially from styrene and divinylbenze (DVB). Most preferably, the copolymer beads utilized in the invention process are prepared entirely from monovinylidene aromatic monomer and a divinylidene aromatic monomer; more preferably, entirely from styrene and DVB.

Preferably, the functionalized copolymer beads of Component (1) employed in the invention process have crush strengths, as defined hereinafter, of at least about 700 g/bead, more preferably at least about 800 g/bead. Preferably, the functionalized copolymer beads of Component (2) have crush strengths of at least about 500 g/bead, more preferably at least about 600 g/bead.

Preferably, the functionalized copolymer beads of Components (1) and (2) have osmotic shock resistance of a magnitude such that less than 15 percent and more preferably less than 10 percent, by number of the beads contact with 10 cycles of alternating 8 molar hydrochloric acid and 8 molar sodium hydroxide, where contact with both the acid and the base constitutes one cycle.

Preferably in the invention process, Component (1) has, prior to contact with the condensate water, been converted primarily to the acid form, e.g. by contact with a strong acid such as sulfuric acid. Likewise, Component (2) preferably has been converted primarily to the hydroxyl form prior to contact with the condensate water, for example by contacting Component (2) with a strong base such as sodium hydroxide, if it is not already in that form.

Components (1) and (2) typically are present in the (1):(2) volume ratio of from about 3:1 to about 0.5:1, and preferably from about 2:1 to about 1:1.

In a particularly preferred mode, the gel-type copolymer beads which are the source of the Component (1) or (2) resins in the ion exchanger, are prepared by:

(i) suspending a multiplicity of styrene-DVB copolymer seed particles of from about 0.1 preferably from about 0.2, up to about 2.0, preferably up to about 1.0, percent DVB by weight, in a continuous aqueous phase, and (ii) imbibing in those seed particles a monomer mixture of styrene, DVB and free radical initiator and then initiating the reaction of the imbibed styrene and DVB until at least about 20 percent, preferably at least about 40 percent until about 85 percent, preferably up until about 90 percent by weight of the initial monomer charge is converted to polymer in the particles, and then (iii) continuing to add to the aqueous suspension a second monomer composition which comprises styrene and DVB but essentially no free radical initiator, under conditions so that the second monomer composition is imbibed in the particles and polymerization of the second monomer composition is catalyzed within said particles.

The foregoing polymerization is then suitably continued until essentially all of the first monomer mixture and the second monomer composition are polymerized. Preferably, the first monomer mixture comprises from about 1, more preferably from about 2, up to about 10, more preferably to about 8 weight percent divinylbenzene. Also preferably, the second monomer composition comprises from about 90, more preferably from about 95, up to about 98, more preferably to about 100 weight percent styrene.

The condensate water treated by the invention process is condensate from a boiling water nuclear reactor. Also, the condensate water is suitably passed through a mechanical filter, such as a standard porous filter or other similar means to remove larger size particles of suspended solids. Preferably, however, the process is conducted without the use of a pretreatment such as the mechanical filtration, because the extremely effective action of the mixed bed resins used in the invention process renders this unnecessary or at least reduces the size of the filtration unit that need be employed.

DETAILED DESCRIPTION OF THE INVENTION

The process of this invention depends upon the utilization of ion exchange resin beads of a very particular morphology, which is referred to as "core and shell structure", as defined hereinafter. They are characterized by having high crush strength and resistance to osmotic shock when converted to ion exchange resins. The copolymer beads are functionalized to form strong acid, weak acid, strong base, or weak base ion exchange resins, all of which compared to typical gel-type resins will exhibit improved mechanical properties. Preferably, only strong acid and strong base ion exchange resins are used in the invention process. Representative anionic or cationic groups are described hereinafter. Said resins retain other desired characteristics of gel-type resins, i.e. high capacity and good ion selectivity.

The term "core/shell morphology" as employed herein, means that the polymeric structure of the copolymer beads used in this invention changes from the inside to the outside of the bead. Said changes in polymeric structure may be somewhat gradual from the inside to the outside of the bead, yielding a bead having a gradient of polymeric structure along any radius thereof. Alternatively, said changes in polymeric structure may be relatively abrupt as one moves along a radius of the bead outward from the center, yielding a bead having a relatively distinct core with one polymeric structure and a second relatively distinct shell with another polymeric structure. The rate of said changes in the polymeric structure of the bead is not particularly critical. Accordingly, as used herein, the terms "core" and "shell" refer to the polymeric structure of the inside and the outside of the bead, respectively, and the use of said terms should not be construed as meaning that the beads used will exhibit a distinct interface between the polymers of the inside and the outside of the bead.

It is understood that in describing "core polymers" and "shell polymers" there is usually, if not always a significant amount of interpenetration of the polymers residing in the core and shell of the copolymer beads. Thus, the "core polymers" will extend somewhat into the shell of the bead, and vice versa. The terms "core polymers" and "shell polymers" and like terminology are employed herein to describe the polymeric material in the named portion of the bead in a general way without attempting to identify any particular polymers as "shell" or "core" polymers.

The aforementioned core/shell morphology of the copolymer beads is detectable using various known techniques for determining the structure of polymeric materials. In general, one or more of the following analytical techniques, among others, can be suitably employed to determine the core/shell morphology of the copolymer beads used in the invention: dynamic thermal analysis, differential thermal analysis, osmium staining techniques, measurement of the respective refractive indices of the core and shell of the copolymer beads, conventional transmission electron microscopy, analytical transmission electron microscopy, scan transmission electron microscopy, and other suitable techniques. In addition, the beads of this invention often exhibit symmetrical strain patterns which are detectable by examination of the beads under polarized light. Often, the core/shell morphology of the copolymer beads of this invention is discernible simply from a visual inspection of the beads at no or low magnification, wherein the core is seen as an area of different color or as a darker or lighter area than the shell.

When functionalized to form an ion exchange resin, the core/shell morphology of these beads can often be seen by immersing a dry bead into water and determining the rate at which the bead becomes hydrated. Typically, the penetration of the shell portion of these beads by water is more rapid than the penetration of the core.

The beads preferably have a shell containing an average proportion of crosslinking monomers which is less than or equal to the average proportion of crosslinking monomers in the core. Beads of this type will have a shell which is softer (i.e. less friable and more elastic) than the core of the bead, thus allowing the bead to retain its shape and integrity yet permitting the bead to distribute energy throughout its structure when subjected to external stresses and pressures. By distributing the energy throughout its structure, it is believed that the crush strength and resistance to osmotic shock of these heterogeneous beads is greatly enhanced.

Alternatively, or in addition to the difference in the crosslink densities of the core and the shell, the polymers in the shell advantageously have a higher molecular weight than the polymers of the core. It is believed that said higher molecular weight of the shell polymers imparts mechanical strength to the bead and increases its resistance to osmotic shock.

The copolymer beads used herein generally exhibit an effective crosslink density which is higher than the average proportion of the crosslinking monomers actually employed in the preparation of the core and the shell. The effective crosslink density is determined from the percent volume increase after swelling the beads with toluene by using a graph such as depicted on page 879 of the Kirk-Othmer Encyclopedia of Chemical Technology, 2nd Edition, published in 1966 by John Wiley and Sons, Vol. II, R.M. Wheaton and A.H. Seamster, "Ion Exchange". In general, the beads of this invention will exhibit an effective crosslink density of about 1.5 to about 5 times that predicted from the average proportion of cross-linking monomers employed in the polymerization of the core and shell.

The copolymer beads used in this invention exhibit excellent crush strength and, when converted to anion or cation exchange resins, exhibit excellent resistance to osmotic shock. The crush strength of the copolymer beads is excellent whether employed as an anion or cation exchange resin. However, the mechanical and osmotic properties of the resin vary somewhat according to the type and amount of active ion exchange groups contained thereon. Since the crush strength of a copolymer bead is generally lowest when fully aminated to form an anion exchange resin, the crush strengths of said fully aminated beads are used herein for the purposes of comparing the crush strengths of copolymer beads. By "fully aminated" is meant that at least 75, preferably at least 90, more preferably at least 95 percent of the repeating units in the bead to which amine groups can be attached bear amine groups. The degree of amination is often indicated from the ion exchange capacity of the aminated resin. Fully aminated gel-type ion exchange resins generally exhibit a dry weight capacity of at least 4.0 meq/g, usually at least 4.2 meq/g, although it is noted that capacity can also be influenced by other factors, such as the degree of crosslinking, the particular polymers present in the resins and the porosity of the resin.

"Crush strength," as that term is used herein, refers to the mechanical load required to break individual resin beads, given as a number average of about 30 testings. The crush strength of gel-type beads used herein which have been fully aminated to form anion exchange resins is at least about 400 g/bead, preferably at least about 500 g/bead, more preferably at least about 600 g/bead. By contrast, most previously used gel-type copolymer beads, when fully aminated to form anion ion exchange resins, exhibit crush strengths of less than 500 g/bead. When sulfonated to form strong acid-type cation exchange resins, the copolymer beads used in the invention process generally exhibit crush strengths of at least about 500 g/bead, preferably at least about 700 g/bead and more preferably at least about 800 g/bead.

The functionalized beads (i.e., those to which active ion exchange sites have been attached) used herein also exhibit excellent resistance to osmotic shock. Resistance to osmotic shock for the purposes of this invention is measured by subjecting a quantity of the functionalized beads to 10 cycles of alternate treatments with 8M hydrochloric acid and 8M NaOH, wherein each treatment is separated by backwashings with deionized water. One full cycle of said treatment comprises (a) immersing a quantity of beads into 8M acid for one minute, (b) washing with deionized water until the wash water is neutral, (c) immersing the beads in 8M caustic soda for one minute and (d) washing the beads with deionized water until the wash water is neutral. All references to alternating treatments with 8M hydrochloric acid and 8M NaOH contained herein refer to repeating cyles of this test. The resistance to osmotic shock of the beads is measured by the number of beads which remain unbroken after 10 cycles of the test. Typically, at least 85 percent of the functionalized beads will remain unbroken after 10 cyles of the osmotic shock test. Preferably, at least 90 percent, more preferably at least 95 percent, of the functionalized beads will remain unbroken after 10 cycles of the osmotic shock test.

In addition, the ion exchange resins comprising copolymer beads having a core/shell morphology as described hereinbefore, when fully aminated or sulfonated, will exhibit ion exchange capacity comparable to those of conventional gel-type resins. It is noted, however, that ion exchange resins having somewhat lower ion exchange capacity can be prepared from the copolymer beads of this invention by intentionally underfunctionalizing the beads. However, the dry weight capacity of the anion exchange resins used in this invention will generally be at least about 2.5, preferably at least 3.5, more preferably at least 4.0 meq/g. Cation exchange resins used in this invention will generally exhibit a dry weight capacity of at least 2.5, preferably at least 4.5, more preferably at least 5.0 meq/g.

The copolymer beads used in this invention can be prepared in any suitable size but advantageously have an average diameter in the range from about 50 to 2000 microns, preferably from about 200 to 1200 microns. Said beads are of the so-called "gel" or "microporous" type. In addition, the core of the beads used herein may contain polymeric material which is water-soluble when ion exchange sites are attached thereto, all or a portion of which material may be extracted to form pores or channels in the beads. The preparation of such gel and extractable seed beads is described more fully hereinafter.

The copolymer beads are advantageously prepared by forming a crosslinked free radical containing matrix (hereinafter "free radical matrix"), and contacting said free radical matrix with a monomer feed comprising at least one monomer under conditions such that free radicals catalyze the polymerization of said monomer to form copolymer beads having a core/shell structure. Said polymerization is carried out as a suspension polymerization wherein the polymeric matrix and the monomers to be polymerized are suspended in a suitable suspending medium which is generally an aqueous solution containing a suspension stabilizer.

The preparation of the free radical matrix can be accomplished by any convenient procedure. Advantageously, said free radical matrix is of the in situ, single stage or second stage types as described hereinbelow. Said "in situ" type free radical matrix is advantageously formed by polymerizing in suspension a monomeric mixture containing mono- and polyethylenically unsaturated addition polymerizable monomers until the conversion of said monomers to polymers is at least 20, preferably at least 50, more preferably between 50 and 80 percent. Said "single stage" free radical matrix is advantageously prepared by suspending a plurality of seed particles in a continuous phase and swelling said seed particles with a free radical initiator. Said "second stage" free radical matrix is advantageously prepared by suspending a plurality of seed particles in a continuous phase, swelling said seed particles with an initial monomer charge comprising mono- and polyethylenically unsaturated monomers and a free radical initiator and polymerizing the monomers within said seed particle until the conversion thereof to polymer is at least 20, preferably 40 to 90, more preferably about 40 to about 95 percent.

The "in situ" type free radical matrix is advantageously prepared by the suspension polymerization of a monoethylenically unsaturated monomer and a polyethylenically unsaturated monomer to form a crosslinked matrix. The amount of polyethylenically unsaturated monomer employed is chosen such that the seed particle is sufficiently crosslinked to render it insoluble in the monomer feed but less than an amount which renders the seed unable to imbibe the monomers of the monomer feed. Generally, said seed particle is prepared using from about 0.05 to about 12.5 weight percent of crosslinking monomer. The polymerization is carried out using free radical initiators under conditions such that a multiplicity of crosslinked polymer particles is prepared. The polymerization is continued until the conversion of the monomers to polymer is at least 20, preferably at least 50, more preferably about 50 to about 80 percent. According to this process, crosslinked polymer particles are prepared containing therein a quantity of unreacted monomers and a multiplicity of free radicals.

In the preparation of the "single stage" free radical matrix, a suspension is formed comprising polymeric seed particles in a continuous phase. Said seed particles advantageously comprise a crosslinked addition polymer but may be a crosslinked condensation polymer such as phenol/formaldehyde polymer. Said seed particles are crosslinked in an amount which renders them insoluble in the type and amount of monomers employed in later stages of the process but less than an amount which renders them unable to imbibe free radical initiators and monomers. In general, said seed particles are prepared using from about 0.05 to about 12.5, preferably from about 0.2 to 2.0, weight percent of a crosslinking monomer. Into the suspension containing the crosslinked seed particles is added a free radical initiator which is essentially insoluble in the continuous phase and which is imbibed by the seed particle. When the free radical matrix is formed in this manner, the seed particle which has imbibed said free radical initiator comprises the "free radical matrix", as that term is employed herein.

Alternately and preferably, a "second stage" free radical matrix is employed which is advantageously prepared by suspending a multiplicity of polymeric seed particles in an appropriate suspending medium, imbibing into said particles a free radical containing initial monomer charge and polymerizing the monomers in the initial monomer charge until the conversion thereof into polymer is at least about 20 to about 95 percent, preferably at least 40 percent. This second stage free radical matrix will then comprise two polymeric networks. In this process, the seed is advantageously an addition polymer but may be a condensation polymer such as a phenol/formaldehyde polymer. Said seed polymer may be crosslinked or noncrosslinked, provided that said seed particle is insoluble in the type and amount of monomers employed in the initial monomer charge. Within the aforementioned broad limits, the amount of crosslinking in the seed particles is chosen such that the seed can imbibe the desired amount of monomers in the initial monomer charge. In general, increased amounts of crosslinking will decrease the amount of the initial monomer charge which can be imbibed by the seed particles. Advantageously, the seed particles are prepared using less than about 10 weight percent of a crosslinking monomer, preferably from about 0.1 to about 1.0 weight percent of a crosslinking monomer.

The initial monomer charge employed in the preparation of the second stage free radical matrix contains both mono- and polyethylenically unsaturated monomers which, when polymerized, form a crosslinked polymer. The amount of crosslinking monomer employed herein is generally sufficient to render the beads, when functionalized, insoluble in water and to impart physical integrity and mechanical strength to the beads. In general, the initial monomer charge will comprise from about 0.5 to about 25, preferably from about 1 to about 12, weight percent of a crosslinking monomer. In addition, said initial monomer charge will advantageously comprise from about 0.005 to about 2 weight percent of a free radical initiator.

To reduce the amount of offsize particles or "fines" formed, the relative proportions of seed particles and initial monomer charge are chosen such that at least 75 weight percent, preferably essentially all of the initial monomer charge is imbibed into the seed particles. Said proportions will, of course, vary with the size of the seed particles and the degree of crosslinking in the seed particle. For example, a seed particle of relatively small size will generally imbibe proportionately less monomer than larger particles of similar crosslink density. Similarly, high crosslink density in the seed particle limits the particle's ability to imbibe monomers. In general, the seed particles will generally imbibe from about 0.5 to about 19, preferably from about 1.5 to about 9, times their weight of the initial monomer charge. The free radical matrix advantageously comprises from about 5, preferably about 10 and most preferably from about 25 to about 90, preferably to about 70, more preferably to about 50, weight percent of the weight of the product copolymer bead.

The prepared free radical matrix is suspended in an appropriate suspending medium. When single stage or second stage free radical matrices are employed, preparation of said matrices and the subsequent addition and polymerization of the monomer feed are advantageously, and preferably, carried out in a single reaction vessel. In general, said suspending medium is a liquid in which both the free radical matrix and the monomers to be contacted therewith are insoluble. Said suspending medium is typically an aqueous solution containing from about 0.1 to about 1.5 weight percent of a suspension stabilizer, but for the polymerization of water-soluble monomers, may be an organic compound. Suitable suspension stabilizers include gelatin, polyvinyl alcohol, sodium methacrylate, carboxymethylmethylcellulose, as well as surfactants such as sodium lauryl sulfate, sulfonated polystyrenes and the like. In addition, the suspension may suitably contain polymerization inhibitors, dispersants, and other materials known to be advantageously employed in the suspension polymerization of ethylenically unsaturated monomers.

The suspension is then contacted with a monomer feed comprising at least one ethylenically unsaturated monomer under conditions such that the free radicals contained in the free radical matrix catalyze the polymerization of said monomer feed. Copolymer beads prepared according to this process usually exhibit a core/shell morphology. Generally, the free radical matrix will reside mainly in the core of the polymer beads prepared by this process, while the polymers formed from the monomer feed will generally reside in the shell of the copolymer bead. However, it is believed that interpenetration occurs between the polymers of the free radical matrix and those derived from the monomer feed. Accordingly, the interface between the core and shell may be gradual rather than sharp.

Advantageously, the suspension is heated to a temperature sufficient to initiate the free radical polymerization of ethylenically unsaturated monomers. To the heated suspension is then added a monomer feed under conditions such that essentially all polymerization of said monomers is initiated by the free radicals contained in the polymer matrix. Preferably, the ratio of the weight of polymer to the combined weight of polymer and monomer present at any time during the addition of the monomer feed (instantaneous conversion) is at least about 20, more preferably at least 50 percent.

Instantaneous conversion may be measured in various ways, with the particular means of monitoring the reaction left to the practitioner as a matter of choice. The reaction may be monitored chemically, such as by taking periodic infrared spectra of the reaction mixture as the reaction proceeds to monitor the conversion of the carbon-carbon double bonds of the monomer to polymer. The difference in density between the unreacted monomers and the polymers can also form a basis for monitoring the mixture. For example, a reaction mixture containing about 1.35 g of styrene monomer per gram of water will have a density of about 0.936 g per cubic centimeter before polymerization and about 1.04 g after polymerization (at about 96 percent conversion). Said differences in density can be monitored using gravimetric techniques or preferably by the use of a nuclear densitometer such as an SG series density gauge sold by Texas Nuclear. More simply, the instantaneous conversion can be readily calculated from the heat of polymerization.

The instantaneous conversion is advantageously controlled by adjusting the rate at which the monomer feed is added to the suspension. Said monomer feed may be added continuously or intermittently to the suspension at constant or various rates during the course of the polymerization. Advantageously, the rate of addition of the monomer feed is such that the instantaneous conversion is at least 20, preferably at least 50 percent at all times during the polymerization reaction.

The monomer feed may contain a proportion of a polyethylenically unsaturated monomer or may consist entirely of monoethylenically unsasturated monomers. It is noted here that the monomers in the monomer feed may vary with time in the proportion of crosslinking monomer contained therein or in the type of monomers employed or both. Advantageously, the monomer feed will, on the average, contain a proportion of crosslinking monomers no greater than the average proportion of crosslinking monomer in the polymeric matrix. More advantageously, a lower proportion of the crosslinking monomer is employed in the monomer feed, yielding a heterogeneous copolymer bead having a higher proportion of crosslinking in the core and a lower proportion of crosslinking in the shell.

In order to ensure that the polymerization of the monomers in the monomer feed is essentially completely catalyzed by the free radicals contained in the polymeric matrix, the monomer feed advantageously contains essentially no initiators. In addition, the continuous phase is also essentially free of initiators. One or more free radical inhibitors which are soluble in the continuous phase are advantageously employed to inhibit the formation of free radicals in said continuous phase. Accordingly, while it is not intended that this invention be bound by any theory, it is believed that the generation of free radicals will occur almost exclusively within the free radical polymer matrix, tending to cause the monomers of the monomer feed to form high molecular weight chains which are highly entangled about the polymeric structure of the free radical matrix.

After all the monomer feed is added to the reaction mixture, the reaction mixture is maintained at the polymerization temperature until the polymerization reaction is essentially complete. Advantageously, the polymerization temperature is increased about 20°-30° C. during the final stages of the polymerization reaction to "finish off" the reaction. The resulting polymer beads are recovered via conventional means such as filtration and advantageously dewatered and dried.

The monomers employed in the preparation of the free radical matrix (i.e., those employed in the formation of the seed particle and initial monomer charge, if any) and the monomer feed are advantageously suspension polymerizable ethylenically unsaturated monomers. Such suspension polymerizable monomers are well known in the art and reference is made to Polymer Processes, edited by Calvin E. Schildknecht, published in 1956 by Interscience Publishers, Inc., New York, Chapter III, "Polymerization in Suspension" by E. Trommsdoff and C.E. Schildknecht, pp. 69–109 for purposes of illustration. In Table II on pp. 78–81 of Schildknecht are listed diverse kinds of monomers which can be employed in the practice of this invention. Of such suspension polymerizable monomers, of particular interest herein are the water-insoluble monomers including the monovinylidene aromatics such as styrene, vinyl naphthalene, alkyl substituted styrenes (particularly monoalkyl substituted styrenes such as vinyltoluene and ethyl vinylbenzene) and halo-substituted styrenes such as bromo- or chlorostyrene, the polyvinylidene aromatic such as divinylbenzene, divinyltoluene, divinyl zylene, divinyl naphthalene, trivinylbenzene, divinyl diphenyl ether, divinyl diphenyl sulfone and the like, esters of $\alpha,\beta$ethylenically unsaturated carboxylic acids, particularly acrylic or methacrylic acid, such as methyl methacrylate, ethyl acrylate, diverse alkylene diacrylates and alkylene dimethacrylates, and mixtures of one or more of said monomers. Of said monomers, the monovinylidene aromatics, particularly styrene or a mixture of styrene with a monoalkyl substituted styrene, the polyvinylidene aromatics, particularly divinylbenzene, esters of $\alpha,\beta$-ethylenically unsaturated carboxylic acids, particularly methyl methacrylate of mixtures containing methylmethacrylate, particularly a mixture of styrene and divinylbenzene or styrene, divinylbenzene and methyl methacrylate are preferably employed herein.

Also included within the polymerizable monomers useful herein are those monomers which form a solution with a liquid, generally water, wherein the resulting solution is sufficiently insoluble in one or more other liquids, generally a water-immiscible oil or the like, such that the monomer solution forms droplets upon its dispersion in said other liquid. Representative of such monomers are water-soluble monomers which can be polymerized using conventional water-in-oil suspension (i.e. inverse suspension) polymerization techniques such as described by U.S. Pat. No. 2,982,749, including ethylenically unsaturated carboxamides such as acrylamide, methacrylamide, aminoalkyl esters of unsaturated carboxylic acids and anhydrides, ethylenically unsaturated carboxylic acids, e.g. acrylic or methacrylic acid, and the like. Preferred of such monomers for use herein are the ethylenically unsaturated carboxamides, particularly acrylamide, and the ethylenically unsaturated carboxylic acids, particularly acrylic or methacrylic acid.

In addition to the aforementioned ethylenically unsaturated monomers, the seed particles employed in the preparation of the single stage and second stage free radical matrices can also comprise a crosslinked condensation polymer such as phenol/formaldehyde resin. In general, said condensation polymers must be able to imbibe the free radical initiators and the monomers of the initial monomer charge, if any, and the monomer feed.

The monomer feed may contain different monomers than those used to prepare the free radical matrix. For example, the monomer feed may comprise styrene, divinylbenzene and methylmethacrylate and the free radical matrix may comprise primarily styrene/divinylbenzene polymers. When the free radical matrix is prepared by imbibing a catalyst containing initial monomer charge into a seed particle, the seed particle may contain different monomers than the initial monomer charge. Similarly, the composition of the polymers of the polymeric shell may be varied from the inside to the outside of the shell by changing the composition of the monomer feed during the course of the polymerization thereof. The polymers contained in the polymer beads used in this invention can be widely varied.

Beads having an extractable seed are advantageously prepared using a highly crosslinked or noncrosslinked seed particle which is insoluble in the amount and type of monomers used in the preparation of the polymeric matrix and the initial monomer charge, but when active ion exchange sites are attached thereto, become water-soluble and are extractable from the bead when immersed in water. Beads prepared having such extractable seeds will contain small voids when all or a portion of the seed is removed therefrom.

Copolymer beads having relatively uniform size are prepared according to the process of this invention by using uniform size seed particles. Uniform size seed particles are prepared by screening the seed particles or by preparing the seed particles using a process which produces polymer particles of uniform size, such as those taught in published European Patent Application Nos. 0005619 and 0051210. Advantageously, at least 80 percent of the seed particles employed to prepare the copolymer beads of this invention are greater than 0.5 and no more than 1.5 times the weight average particle size of the seed particles.

The size of the copolymer beads of this invention is advantageously in the range from about 50 to 2000 microns, preferably from about 200 to 1200 microns. Control of the size of the beads is achieved primarily by controlling the size and crosslinking in the seed particles employed, if any, and the amount of monomers employed in the monomer feed. The seed particles can range in size from very small particles, i.e. about 10 microns, to larger particles having a diameter of 750 microns or more. Preferably the size of the seed particle is in the range from about 100 to about 750 microns in diameter.

The polymer beads are converted to anion or cation exchange beads using techniques well known in the art for converting crosslinked addition polymers of a mono- and polyethylenically unsaturated monomer to such resins. In the preparation of weak base resins from poly(vinylaromatic) copolymer beads such as crosslinked polystyrene beads, the beads are advantageously haloalkylated, preferably halomethylated, most preferably chloromethylated, and the ion active exchange groups subsequently attached to the haloalkylated copolymer. Methods for haloalkylating the crosslinked addition copolymers and the haloalkylating agents included in such methods are also well known in the art. Reference is made thereto for the purposes of this invention. Illustrative of such are U.S. Pat. Nos. 2,642,417; 2,960,480; 2,597,492; 2,597,493; 3,311,602 and 2,616,817 and *Ion Exchange* by F. Helfferich, published in 1962 by McGraw-Hill Book Company, N.Y. Typically, the haloalkylation reaction consists of swelling the crosslinked addition copolymer with a haloalkylating agent, preferably bromomethylmethyl ether, chloromethylmethyl ether or a mixture of formaldehyde and hydrochloric acid, most preferably chloromethylmethyl ether and then reacting the copolymer and haloalkylating agent in the presence of a Friedel-Craft catalyst such as zinc chloride, iron chloride and aluminum chloride.

Generally, ion exchange beads are prepared from the haloalkylated bead by contacting said bead with a compound reactive with the halogen of the haloalkyl group and which, upon reaction, forms an active ion exchange group. Such compounds and methods for preparing ion exchange resins therefrom, i.e., weak base resins and strong base resins, are well known in the art and U.S. Pat. Nos. 2,632,000; 2,616,877; 2,642,417; 2,632,001; 2,992,544, and F. Helfferich supra are illustrative thereof. Typically, a weak base resin is prepared by contacting the haloalkylated copolymer with ammonia, a primary amine or a secondary amine. Representative primary and secondary amines include the methyl amine, ethyl amine, butyl amine, cyclohexyl amine, dimethyl amine, diethyl amine and the like. Strong base ion exchange resins are prepared using tertiary amines such as trimethyl amine, triethyl amine, tributyl amine, dimethylisopropanol amine, ethylmethylpropyl amine or the like as aminating agents.

Amination generally comprises heating with reflux a mixture of the haloalkylated copolymer beads and at least a stoichiometric amount of the aminating agent, i.e. ammonia or the amine, to a temperature sufficient to react the aminating agent with the halogen atom attached to the carbon atom in the alpha position to the aromatic nucleus of the polymer. A swelling agent such as water, ethanol, methanol, methylene chloride, ethylene dichloride, dimethoxymethylene or combinations thereof is optionally, but advantageously employed. Conventionally, amination is carried out at conditions such that anion exchange sites are uniformly dispersed throughout the entire bead. Such complete amination is generally obtained within about 2 to about 24 hours at reaction temperature between 25° and about 150° C.

Methods for converting copolymer beads other than poly(vinyl-aromatic) beads to anion exchange resins are illustrated in Helfferich, supra, pp. 48–58. In addition, methods for attaching other types of anion exchange groups, such as phosphonium groups, to copolymer beads are described therein.

Cation exchange resin beads can be prepared using techniques well known in the art for converting the crosslinked addition copolymer of mono- and polyethylenically unsaturated monomers to a cation exchange resin. Illustrative of such methods of preparing cation exchange resin are U.S. Pat. Nos. 3,266,007;

2,500,149; 2,631,127; 2,664,801; 2,764.566 and F. Helfferich, supra. In general, the cation exchange resins useful herein are strong acid resins which are prepared by sulfonating the copolymer beads. While the sulfonation may be conducted neat, generally, the bead is swollen using any suitable swelling agent and the swollen bead is reacted with the sulfonating agent such as sulfuric or chlorosulfonic acid or sulfur trioxide. Preferably, an excess amount of the sulfonating agent, for example, from about 2 to about 7 times the weight of the copolymer bead is employed. The sulfonation is conducted at a temperature from about 0° to about 150° C.

Since the amount of crosslinker, e.g. DVB, employed in preparation of the core/shell structure beads varies as a function of the structure radius due to the techniques used to prepare the beads, a method to express crosslinking that reflects this fact will be employed. For the unfunctionalized copolymer beads, a toluene swelling test is useful to determine the "effective" crosslink density as noted below in Example 1. For the functionalized resins, it is appropriate to use a water-absorption test in order to determine what is referred to in Examples 2 and 4 as "Apparent Relative Crosslink Percentage".

This value is derived by the comparison of the water absorptive capacity of a functionalized resin with the predetermined water absorptive capacity of a set of standard gel-type resins made from the same comonomers and of like functionality and equal capacity. To obtain the standards by which the "Apparent Relative Crosslink" may be determined in practical routine operations, a series of standard gel-type, e.g. styrene-DVB resins, are prepared having known DVB content, e.g. 4, 6, 8, 10, 12 etc. percent. These resins are then given the desired functional groups, and a graph of the amounts of water absorbed, by the resin at each level of DVB content, and for each functional group at various capacities, e.g. 3.0, 3.5, 4.0, 4.5, 5.0 etc. meq/g, is plotted from experimental findings.

By then comparing the measured water absorption capacity, normally recorded in weight percent water absorbed, of the shell/core resins having the same level of ion exchange capacity and of the same functionality, one may note the amount of DVB crosslinker in the standard gel-type resin which exhibits the same level of water absorption as the core/shell ion exchange resin. The "Apparent Relative Crosslink Percentage" is then reported as the weight percent of DVB crosslinker that is present in the comparable standard resin.

In the present invention process, Component (1) and (2) resins suitably have "Apparent Relative Crosslink Percentages" of less than about 8 percent, preferably less than or equal to about 7 percent and more preferably less than or equal to about 6 percent, and more than about 3, preferably more than or equal to about 4 percent and most preferably more than or equal to about 5 percent.

With regard to the operation of the invention process in the day to day operations of a BWR plant, no significant changes are required except to substitute the mixed bed ion exchanger described herein for ion exchangers presently employed for ion removal purposes.

When "breakthrough" occurs, the mixed bed exchanger may usually be reactivated several times by backwashing and agitation of the bed. However, because of the low level radioactivity of the captured iron ions and particles, the bed is not normally regenerated in the sense commonly used for ion exchangers, i.e. subjecting to strong acids and bases. Instead the resin with the captured irradiated species is normally consolidated, collected and disposed of in the fashion of other low-level waste from nuclear power reactors.

The effluent from the bed may be monitored by standard means, such as low level scintillation detection devices and analytical techniques for iron, to observe when breakthrough occurs and at that time the desired steps may be taken to reactivate the bed or collect and dispose of the used resin.

Because of the resins, exceptional toughness and resistance to crushing, the generation of resin "fines" is kept to a minimum, further enhancing the performance and life of the resin bed. Standard practices of screening the resins to remove any fines generated in the shipping and handling of the resin particles, may of course be employed when initially loading the apparatus, to maximize performance of the mixed bed ion exchanger.

The following examples are intended to illustrate the invention and are not intended to limit the scope thereof in any way. All parts and percentages are by weight unless otherwise noted.

EXAMPLE 1

Into a 3-liter, stainless steel reactor equipped with an agitator are loaded 35 parts by weight of 0.3 percent crosslinked styrene/divinylbenzene copolymer seed having a particle size of 150–300 microns and sufficient water to suspend the seed particles. Further added, with agitation, is an initial monomer charge comprising 1.9 parts divinylbenzene (DVB), 63 parts styrene, 0.036 part t-butylperoctoate (TBPO) (based on the total weight of all monomers employed), 0.025 part t-butylperbenzoate (TBPB), (based on the total weight of all monomers employed), 0.15 part carboxymethyl methylcellulose (CMMC) and 0.15 part sodium dichromate. Water is then added in an amount such that the weight ratio of aqueous to organic phase is 1.0 after the addition of the monomer feed. The reaction mixture is then heated to 70° C. and maintained at 70° C. for 3 hours, at which time a monomer feed of 98.5 percent of styrene and 1.5 percent of DVB is begun. The monomer feed is fed at a constant rate into the reactor over a 10-hour period until said monomer feed comprises 71.4 percent by weight of the combined weight of the initial charge and the monomer feed. The reaction mixture is heated at 90° C. for an additional 1.5 hours and then raised to 100° C. for approximately 1.5 hours.

A portion of the copolymer beads thus obtained is dried and a 20-ml portion is measured into a column. The beads are then immersed in toluene and the change in volume of the beads is measured. From the change in volume, the effective crosslink density is determined using a graph such as depicted on page 879 of the "Kirk-Othmer Encyclopedia of Chemical Technology", 2nd Ed., published in 1966 by John Wiley and Sons, Vol. II, R.M. Wheaton and A.H. Seamster, "Ion Exchange".

A 100-g portion of the copolymer beads is chloromethylated by reacting the beads with an excess of chloromethylmethyl ether in the presence of ferric chloride. The chloromethylated beads are then reacted with trimethylamine to form a strong base anion exchange resin bearing a plurality of quaternary ammonium ions. The anion exchange resin is then tested for percent original spheres, crush strength, resin size, osmotic shock resistance, dry weight capacity, and water retention capacity.

The crush strength of the anion exchange resin of this and the following examples is determine by testing about 30 beads using a Chatillion Scale, Model DPP-1 KG. The force, in grams, required to fracture each individual bead is recorded, with the crush strength reported as the average of about 30 such testings.

The number percent of the resin beads having flawless spheres (i.e. "percent original perfect spheres"), is evaluated by placing a small amount of the resin in a petri dish. A microscope having a camera mounted thereon is adjusted until about 200 resin beads fall within the vision field of the camera. A photograph is then taken. From the photograph, the total number of beads are counted, the total number of broken or cracked are counted, and the number percent of spherical beads calculated.

The size of the resin beads, when swollen with water, is determined by screen analysis.

The resistance of the resin beads to osmotic shock is tested using the procedure described hereinbefore wherein the beads are contacted with 10 cycles of alternating 8M hydrochloric and 8M NaOH, with the results reported as the number percent of beads which remain unbroken after 10 cycles of the test, using microphoto graphic counting technique described above.

The dry weight capacity of the resin is determined by drying a sample of the resin in the chloride form under an infrared lamp on a moisture balance until a constant weight is obtained. The dried resin is then cooled to room temperature in a closed vessel. About 0.5 gram of the dried resin is weighed into a suitable flask. The resin is then heated to 70°–80° C. with 100 ml of distilled water, 4 ml of sulfuric acid and 5 g $Na_2SO_4$ for 5 minutes. The mixture is cooled and titrated with 0.1N $AgNO_3$ to an endpoint as indicated using a chloride sensitive electrode. The dry weight capacity is then reported as meq/g of resin. The properties of the resin so prepared are as follows:

Percent Original Perfect Spheres: 98
Average Crush Strength: 1470 g/bead
Resin Bead Size: 600–1000 microns
Percent Unbroken (Osmotic Shock Test—10 cycles): 80
Dry Weight Capacity: 4.28 meq/g
Toluene Swell Effective Crosslink Density: 4
Average DVB Percentage: 1.64
(Percent of DVB used in preparation of copolymer beads calculated based on total weight of seeds and all monomer fed)

EXAMPLE 2

In a fashion similar to the method described in Example 1, copolymer beads are prepared as follows:

Into a sealed stainless steel reactor equipped with an agitator are loaded 100 parts water and 100 parts of a styrene-DVB (0.3% DBV) copolymer as seeds which have a very uniform average particle size of 350–360 microns. The mixture is mechanically agitated. To the reactor is added 124.7 parts of monomer mixture consisting of 87.1% styrene, 12.4% of a 56% solution DVB, 0.18% TBPO and 0.14% TBPB and the resulting mixture is agitated for one hour at 30° C. to fully imbibe the monomer mixture in the seed particles.

Then is added to the reactor 127.8 parts of suspending agent consisting of 97.8% water, 1.7% gelatin and 0.5% (30% active) sodium lauryl sulfate and the pressure in the reactor is reduced to avoid explosive air/monomer mixtures. The contents of the reactor are then heated to 78° C. and held at that temperature for two hours.

A second monomer feed consisting of 96.4 parts styrene and 2 parts of (3.6 parts of a 56% active solution) DVB is then pumped into the reactor over four hours at a rate of 1 part per minute, until 240 parts of the second monomer feed have been added. The contents of the reactor are held at 78° C. for three hours more, then raised to 110° C. and held at that temperature for two additional hours to complete polymerization of the monomers.

The reactor contents are cooled to under 40° C. and the resulting beads are then washed with water to remove the suspending agent and are dried.

EXAMPLE 2A

In the manner described in Example 1, a portion of copolymer beads prepared by the method described in Example 2 are converted to strong base anion resins by a standard means of functionalizing with chloromethyl methyl ether and trimethyl amine. The resulting anion exchange resin beads have the following properties, in chloride form:

| | |
|---|---|
| Average Crush Strength: | 460 g/bead |
| Resin Bead Size (±10 percent): | 550 microns |
| Percent Unbroken (Osmotic Shock Test - 10 cycles): | 95 |
| Apparent Relative Swell Crosslink Percentage: | 6 |
| Dry Weight Capacity: | 3.9 meq/g |

EXAMPLE 2B

A portion of copolymer beads prepared by the method described in Example 2 are converted to strong acid cation resins by standard means of sulfonation in a glass lined reactor in the following manner:

To the reactor 464 parts of 99 percent sulfuric acid are added and to this, 100 parts of the copolymer beads are added slowly with mechanical agitation. Also with mechanical agitation, a chlorinated solvent, 17 parts, is added to swell the beads.

The reactor contents are then gradually heated to 115° C. and maintained at that level for two hours after which they are permitted to cool. They are then treated with portions of aqueous sulfuric acid of decreasing concentration until the beads are fully hydrated. The resin beads are converted to the sodium form by slurring in aqueous 2 molar sodium hydroxide and washed with water to remove salt and excess caustic.

In the sodium form, the resulting cation exchange resin beads have the following properties:

| | |
|---|---|
| Average Crush Strength: | 680 g/bead |
| Resin Bead Size (±10 percent): | 580 microns |
| Percent Unbroken (Osmotic Shock Test - 10 cycles): | 98 |
| Apparent Relative Swell Crosslink Percentage: | 6 |
| Dry Weight Capacity: | 4.8 meq/g |

EXAMPLE 3

The resin beads of example 2A are, converted to about 93 percent hydroxyl form by chromatographically first converting them to carbonate form with sodium carbonate solution and then to the hydroxy form with an excess of 1 molar sodium hydroxide and then washing repeatedly with water. The resin beads of example 2B are converted to about 98 percent hydrogen acid and then washing repeatedly in water to remove any excess acid and any salt formed.

Then aqueous slurries of each resin are combined in a ratio of 1 part the anion exchange resin to 2 parts of the cation exchange resin (parts by volume, wet) in a vessel of suitable size and then mechanically mixed by air sparging to obtain a bed in which the two species are distributed relatively uniformly throughout. This uniform mixture is then loaded carefully into an upright column of sufficient diameter to handle the condensate flow rate in a BWR. The column, mounted securely, is then connected into the condensate flow stream by suitable valving. The condensate influent to the column has an iron content of about 20 parts per billion (ppb). In runs with two such columns, the effluent from the columns has an iron content at day 1 initially of between 1.0 and 1.5 ppb, falling to between 0.5 and 0.6 ppb on day 2 and remaining after 15 days in operation, at between 0.3 and 0.9 ppb.

EXAMPLE 4

In the same fashion as Example 3, a mixed bed is prepared from commercial gel-type anion and cation exchange resins having the following characteristics:

| Anion Exchange Resin | |
|---|---|
| Average Crush Strength: | 390 g/bead |
| Bead Size Range: | 300–1200 microns |
| Percent Unbroken (Osmostic Shock Test - 10 cycles): | 45 |
| Apparent Relative Crosslink Percentage: | 8 |
| Dry Weight Capacity: | 3.9 meq/g |
| Cation Exchange Resin | |
| Average Crush Strength: | 680 g/bead |
| Bead Size Range: | 300–1200 microns |
| Percent Unbroken (Osmotic Shock Test - 10 cycles): | 45 |
| Apparent Relative Crosslink Percentage: | 8 |
| Dry Weight Capacity: | 4.8 meq/g |

A mixed bed of these two Anion and Cation resins in essentially the same ratio as for the Example 3 resins, is prepared, loaded in a column and fed the same condensate influent stream (20 ppb iron) as in Example 3. The initial effluent from mixed bed is at day 1 about 0.5 ppb, at about 0.5 ppb on day 2 and then rising steadily thereafter to reach about 5 ppb on day 5 and remaining at about 4.5 ppb iron on day 15.

I claim:

1. A process for treatment of power plant condensate water which contains colloidal iron, comprising:
   (a) contacting the condensate water with a mixed bed ion exchanger and
   (b) thereafter removing the water with reduced colloidal iron content from contact with the ion exchanger,
   wherein the mixed bed ion exchanger consists essentially of:
   Component (1)—a particulate cation exchange resin bead, at least a portion of which is in the acid form, and
   Component (2)—a particulate anion exchange resin bead,
   and wherein at least the Component (1) resin, prior to functionalization, primarily comprises gel-type copolymer beads having core and shell structure, which beads have been produced in stages by first forming in a continuous phase a multiplicity of polymer matrices which contain free radicals, then imbibing in said matrices a monomer feed comprising at least one monomer but no free radical initiator and subjecting the imbibed monomer feed to conditions such that the free radicals in the matrices catalyze polymerization of the monomer feed within the matrices.

2. The process of claim 1 wherein Component (2) resin, prior to functionalization, primarily comprises gel-type copolymer beads, having core and shell structure, which have been produced in stages by first forming in a continuous phase a multiplicity of polymer matrices which contain free radicals, then imbibing in said matrices a monomer feed comprising at least one monomer but no free radical initiator and subjecting the imbibed monomer feed to conditions such that the free radicals in the matrices catalyze polymerization of the monomer feed within the matrices.

3. The process of claim 1 or 2 wherein the copolymer beads comprise beads of copolymers prepared from a vinylidene aromatic monomer and a divinylidene aromatic monomer.

4. The process of claim 1 wherein the copolymer beads comprise beads of copolymers prepared from styrene and divinylbenzene.

5. The process of claim 2 wherein the copolymer beads of Component (1) and Component (2) resins both comprise copolymer beads prepared from styrene and divinylbenzene.

6. The process of claim 4 or 5 wherein the functionalized copolymer beads of Components (1) and (2) have crush strengths of at least about 500 g/bead and 400 g/bead respectively.

7. The process of claim 4 or 5 wherein the functionalized copolymer beads of Components (1) and (2) have osmotic shock resistance such that less than 15 percent by number of the beads are broken after contact with 10 cycles of alternating 8 molar hydrochloric acid and 8 molar sodium hydroxide.

8. The process of claim 1 or 2 wherein the gel-type copolymer beads are prepared by:
   (i) suspending a multiplicity of styrene—divinylbenzene copolymer seed particles, of from about 0.1 to about 1.0 percent divinylbenzene by weight, in a continuous aqueous phase,
   (ii) imbibing in said seed particles a monomer mixture of styrene and divinylbenzene and free radical initiator and then initiating the reaction of the imbibed styrene and divinylbenzene until about 40 to 95 weight percent of said monomers are converted to polymer in the particles, then,
   (iii) continuing to add to the aqueous suspension a second monomer composition, comprising styrene and essentially no free radical initiator, under conditions that the second monomer composition is imbibed in the particles and the polymerization of the second monomer composition is catalyzed within said particles.

9. The process of claim 8 wherein stage (ii) the first monomer mixture comprises about 1 to about 12 percent by weight dinvinylbenzene.

10. The process of claim 8 wherein stage (iii) the second monomer composition comprises about 95 to about 100 percent styrene.

11. The process of claim 1 wherein Component (1), prior to contact with the condensate water, has been converted primarily to the acid form.

12. The process of claim 1 or 2 wherein Component (2), prior to contact with the condensate water, has been converted primarily to the hydroxyl form.

13. The process of claim 1 or 2 wherein the volume ratio of component (1): Component (2) is between about 2:1 and about 1:1.

14. The process of claim 1 wherein the gel-type copolymer beads have an average diameter size of from 200 to 1200 microns.

* * * * *